(12) United States Patent
Adoni et al.

(10) Patent No.: US 10,176,025 B2
(45) Date of Patent: Jan. 8, 2019

(54) RECOMMENDATION FOR AN INDIVIDUAL BASED ON A MOOD OF THE INDIVIDUAL

(71) Applicant: International Business Machines Corporation, Armonk, NY (US)

(72) Inventors: Siddique M. Adoni, Bangalore (IN); David Nahamoo, Great Neck, NY (US); Pamela A. Nesbitt, Ridgefield, CT (US); Dhandapani Shanmugam, Bangalore (IN)

(73) Assignee: INTERNATIONAL BUSINESS MACHINES CORPORTION, Armonk, NY (US)

(*) Notice: Subject to any disclaimer, the term of this patent is extended or adjusted under 35 U.S.C. 154(b) by 379 days.

(21) Appl. No.: 14/630,674

(22) Filed: Feb. 25, 2015

(65) Prior Publication Data

US 2016/0246855 A1   Aug. 25, 2016

(51) Int. Cl.
| | |
|---|---|
| G06F 17/30 | (2006.01) |
| G06F 9/54 | (2006.01) |
| H04L 29/08 | (2006.01) |
| H04W 4/21 | (2018.01) |
| H04N 21/45 | (2011.01) |
| G06N 7/00 | (2006.01) |

(52) U.S. Cl.
CPC ........ G06F 9/542 (2013.01); G06F 17/30029 (2013.01); G06F 17/30867 (2013.01); G06N 7/005 (2013.01); H04L 67/18 (2013.01); H04L 67/22 (2013.01); H04L 67/306 (2013.01); H04N 21/4532 (2013.01); H04W 4/21 (2018.02)

(58) Field of Classification Search
CPC .................................................. H04N 21/4532
See application file for complete search history.

(56) References Cited

U.S. PATENT DOCUMENTS

| | | | |
|---|---|---|---|
| 7,921,067 B2 | 4/2011 | Kemp et al. | |
| 9,031,216 B1* | 5/2015 | Kamvar | H04L 12/1827 379/202.01 |
| 2008/0109391 A1 | 5/2008 | Chan | |
| 2011/0179116 A1 | 7/2011 | Solomon et al. | |
| 2012/0130196 A1 | 5/2012 | Jain et al. | |
| 2012/0143693 A1 | 6/2012 | Chung et al. | |

(Continued)

FOREIGN PATENT DOCUMENTS

WO    2005113099 A2    12/2005

OTHER PUBLICATIONS

IBM: List of IBM Patents or Patent Applications Treated as Related (Appendix P), Feb. 8, 2016, pp. 1-2.

(Continued)

*Primary Examiner* — Robert W Beausoliel, Jr.
*Assistant Examiner* — Nirav K Khakhar
(74) *Attorney, Agent, or Firm* — Erik K. Johnson

(57) ABSTRACT

Generating recommendations for an individual based on a mood of the individual. Receiving information corresponding to one or more activities associated with an individual over a period of time. The received information corresponding to the one or more activities associated with the individual is processed to detect a mood of the individual. A recommendation is generated for the individual based on the detected mood of the individual and a future event associated with the individual. The future event has an occurrence at a later time instance.

10 Claims, 6 Drawing Sheets

(56) References Cited

U.S. PATENT DOCUMENTS

| | | |
|---|---|---|
| 2013/0253329 A1 | 9/2013 | Sato et al. |
| 2014/0004886 A1* | 1/2014 | Gillett .................. H04W 4/027 |
| | | 455/456.6 |
| 2014/0215507 A1* | 7/2014 | Wouhaybi .............. G06Q 30/02 |
| | | 725/14 |

OTHER PUBLICATIONS

Pending U.S. Appl. No. 15/041,291, filed Feb. 11, 2016, titled "Recommendation for an Individual Based on a Mood of the Individual," pp. 1-30.

Delo, "Microsoft Files Patent to Serve Ads Based on Mood, Body Language; Kinect Tech Seems Most Ripe for Potential Implementation," Advertising Age, Jun. 12, 2012, pp. 1-6.

Wilson, "What's Next in Advertising?: Mood-Based Advertising," FreshPeel.com, Jun. 14, 2012, http://freshpeel.com/2012/06/whats-next-in-advertising-mood-based-advertising/, pp. 1-7.

Fiegerman, "Hoppit Helps You Find Restaurants Based on Your Mood," Mashable.com; Business, Hoppit, Dec. 6, 2012.

Mell et al., "The NIST Definition of Cloud Computing," National Institute of Standards and Technology, Information Technology Laboratory, Version 15, Oct. 7, 2009.

\* cited by examiner

US 10,176,025 B2

RECOMMENDATION FOR AN INDIVIDUAL BASED ON A MOOD OF THE INDIVIDUAL

BACKGROUND

The present invention relates to context based systems, and more specifically, to generation of recommendations for an individual based on a mood or an emotional state of the individual at any given instance of time. Everyday activities influence the mood of an individual. For example, the factors that affect the mood of the individual may include work, context of the work, interaction with others, physical exertions and the likes. Many times, an individual may be in a particular mood and the next planned activity of the individual may not go well with the individual.

SUMMARY

According to embodiments of the present invention, provided is a system, a computer program product and a method for generating a recommendation for an individual based on a mood of the individual. The method comprises receiving information corresponding to one or more activities associated with an individual over a period of time. The method further comprises processing the information corresponding to one or more activities associated with the individual to detect an emotional state of the individual. The method further comprises generating a recommendation for the individual based on the detected emotional state of the individual and a future event associated with the individual, wherein the future event has an occurrence at a later time instance.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
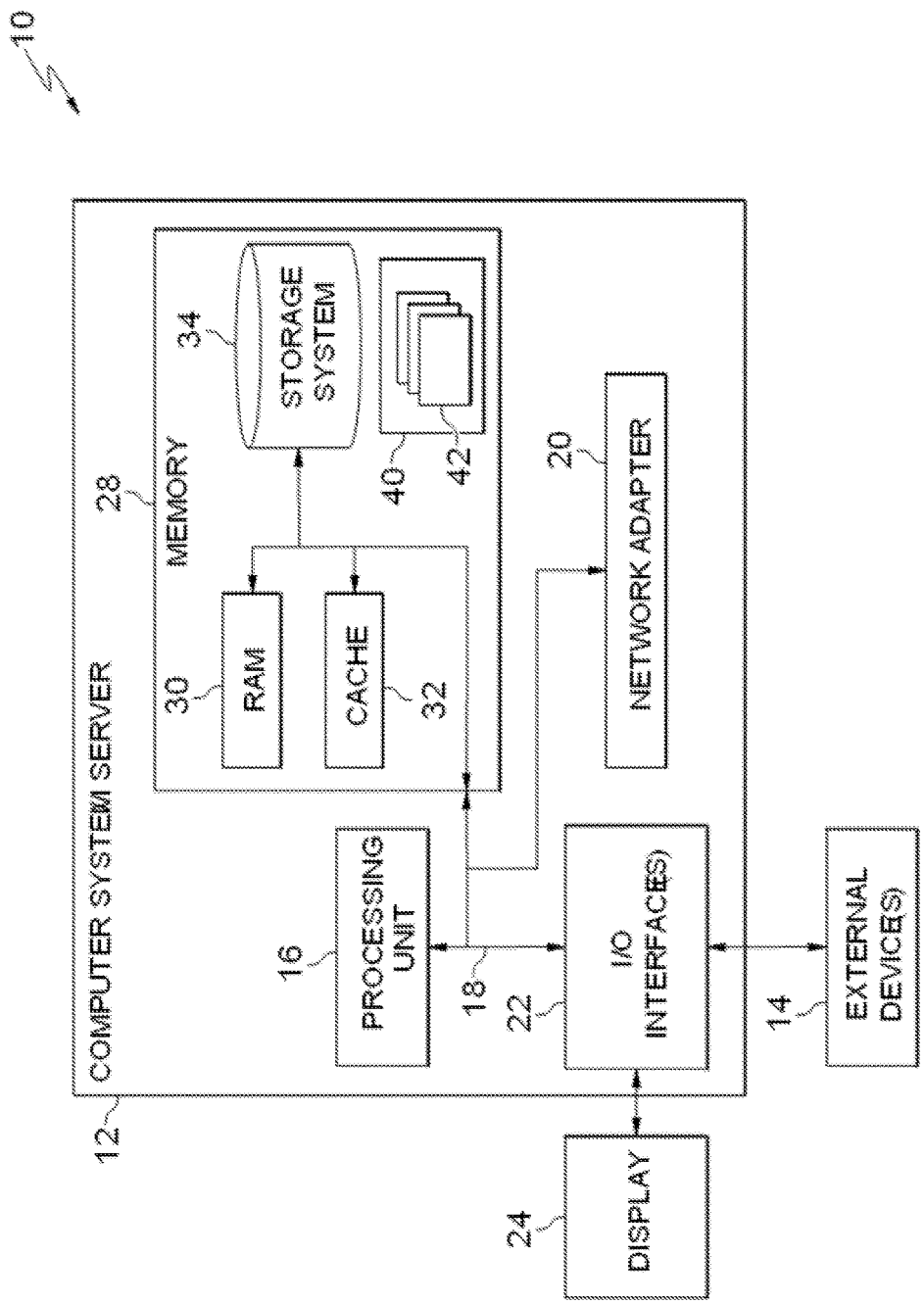
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
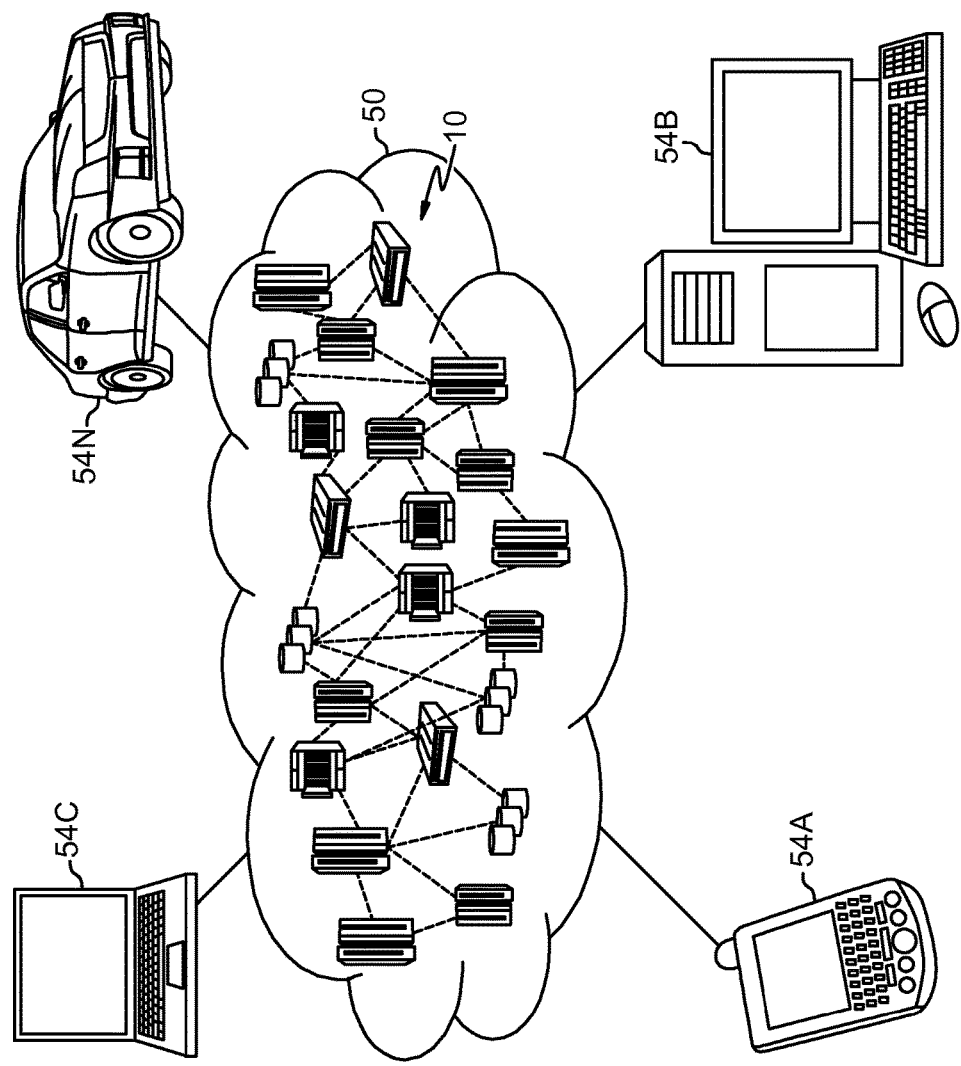
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
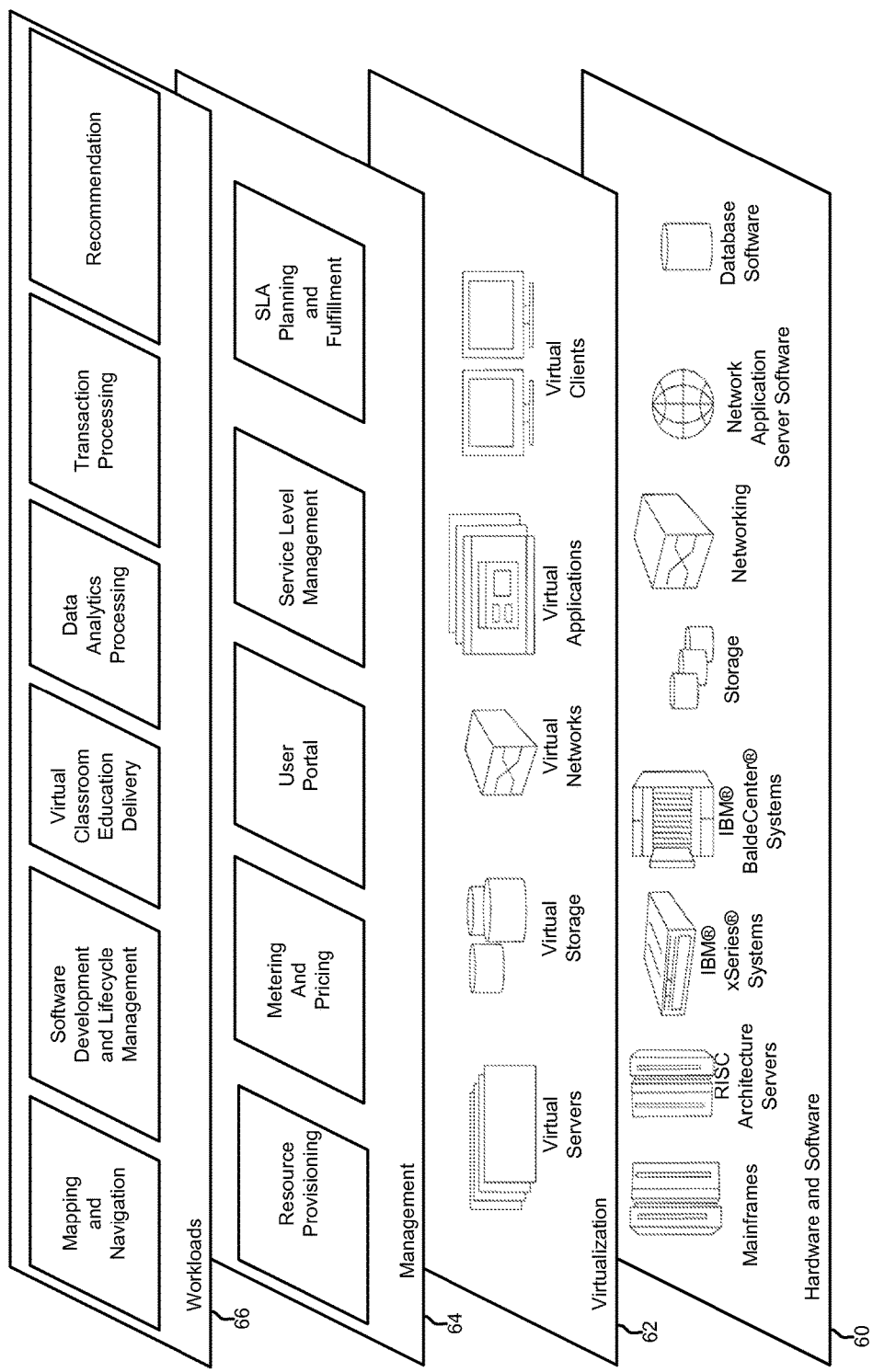
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network client, in one example IBM WebSphere® client; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; document revision; and recommendation, which represents the functionality that is provided under the embodiments of the present invention.

It is understood that all functions of the present invention as described herein typically may be performed by recommendation (workloads layer 66, which can be tangibly as modules of program code 42 of program/utility 40 of FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment known now or later developed.

Figure 4:
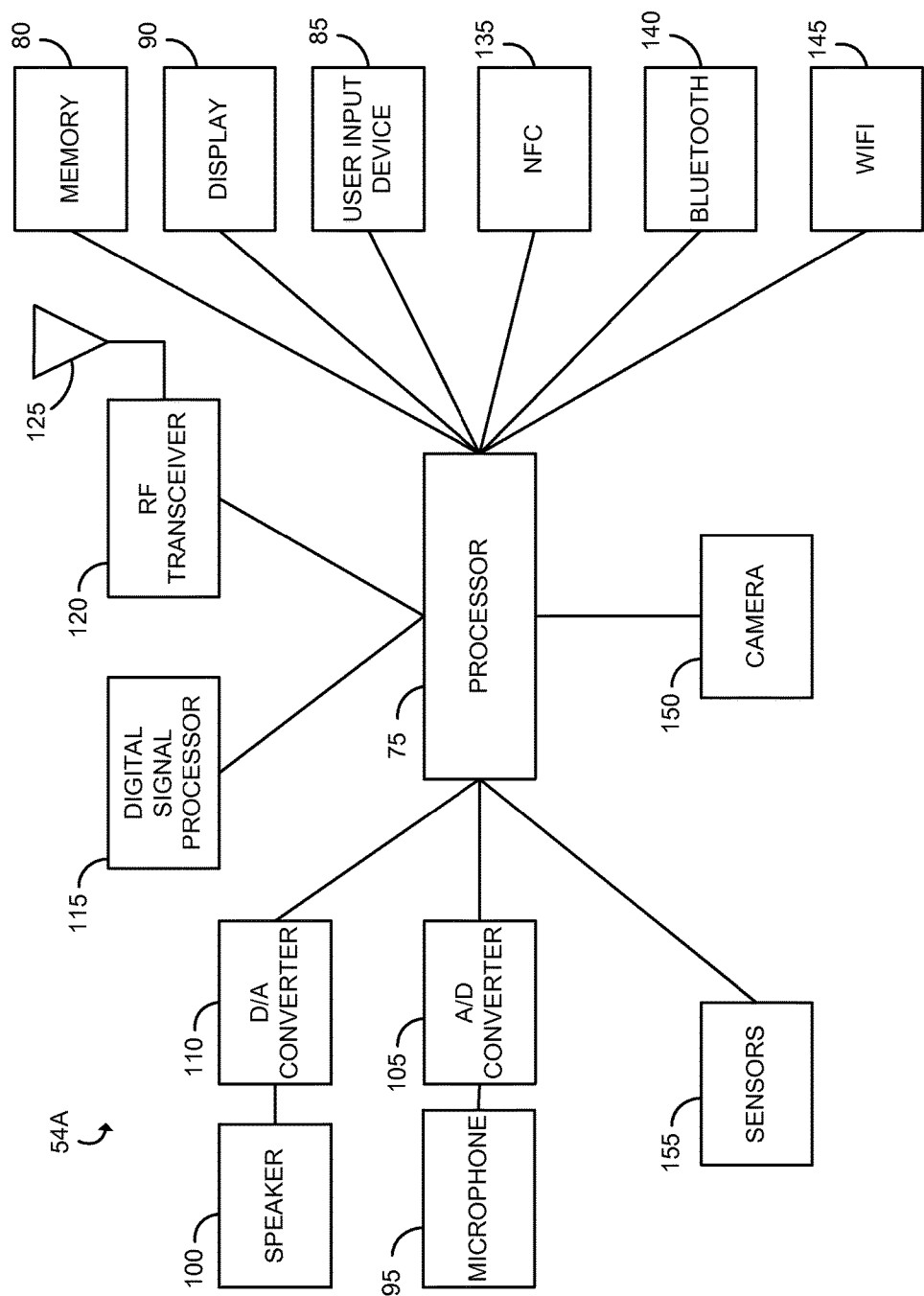
FIG. 4 depicts a schematic block diagram illustrating example components of a cellular telephone according to an embodiment of the present invention.

FIG. 4 is a schematic block diagram illustrating example components of a cellular telephone that may be used to implement an embodiment of the invention. The cellular telephone 54A illustratively includes a processor 75, a memory 80, a user input device 85 and a display 90. The user input device 85 may comprise a keypad or a touch input, and the like. The display 90 may include a full graphic liquid crystal display (LCD) or a light emitting diode (LED) display, and the like. The memory 80 may include a volatile memory, such as random access memory (RAM) and/or cache memory and a non-volatile memory, such as a flash memory. The processor 75 is operably coupled to the user input device 85, the display 90, and the memory 80. The processor 75 controls the operation of the display 90, as well as the overall operation of the cellular telephone 54A, in response to receipt of an input from the user input device 85.

The cellular telephone 54A also includes a microphone 95 to capture voice and a speaker 100 to output audio. The microphone 95 is operably coupled to the processor via an analog to digital converter 105 and the speaker 100 is operably coupled to the processor 75 via a digital to analog converter 110. The cellular telephone 54A further comprises a, digital signal processor (DSP) 115, a radio frequency (RF) transceiver 120 and an antenna 125 for performing cellular communications, such as, voice and data communication. The digital signal processor 115 is configured to perform the baseband processing of the communication signals transmitted or received by the cellular telephone 54A. The specific design and implementation of the RF transceiver 120 is dependent upon the communication network in which the cellular telephone 54A is intended to operate. For example, the cellular telephone 54A may include a RF transceiver 120 designed to operate with the General Packet Radio Service (GPRS) mobile data communication networks, and also designed to operate with any of a variety of voice communication networks, such as Advance Mobile Phone System (AMPS), Time Division Multiple Access (TDMA), Code Division Multiple Access (CDMA), Wideband Code Division Multiple Access (WCDMA), Personal Communications Service (PCS), Global System for Mobile (GSM), Enhanced Data Rates for GSM Evolution (EDGE), etc. Other types of data and voice networks, both separate and integrated, may also be utilized with the cellular telephone 54A. The cellular telephone 54A may also be compliant with other communication standards such as 3GSM, 3rd Generation Partnership Project (3GPP), and Universal Mobile Telecommunications System (UMTS), etc.

The cellular telephone 54A may send and receive communication signals over a communication network. Signals received from the communication network by the antenna 125 are routed to the RF transceiver 120, which is configured to provide the required signal amplification, frequency down conversion, filtering, channel selection, etc., In a similar manner, signals to be transmitted to a communication network, are modulated and encoded by the DSP 115 and are then provided to the RF transceiver 120 for frequency up conversion, filtering, amplification and transmission to the communication network via the antenna 125. The RF transceiver 120 may be configured for two-way RF communication having data and, optionally, voice communication capabilities. In addition, the cellular telephone 54A may have the capability to communicate with other computer systems via the Internet.

The cellular telephone 54A may also comprise other communication modules, such as near field communication (NFC) module 135, Bluetooth™ (BT) communication module 140, infrared communication module and a Wi-Fi communication module 145.

The cellular telephone 54A may also comprise one or more cameras 150 for capturing images. In the shown example of FIG. 4, only one camera 150 has been illustrated, however, a cellular telephone 54A may comprise a plurality of cameras 150. For example, in general, a cellular telephone 54A comprises a first camera at the front side and a second camera at the back side. The first camera at the front side of the cellular telephone 54A facilitates capturing of images of the user and also facilitates video calls. The cellular telephone 54A may also comprises one or more sensors 155. For example, the cellular telephone 54A may comprise, one or more sensors 155, such as, a temperature sensor, a gyroscope, an accelerometer, a magnetometer, a light sensor, a proximity sensor, and a global positioning system (GPS) receiver. The sensors 155 are operably coupled to the processor 75 and the output from the respective sensors 155 is provided to the processor 75.

Those of the ordinary skill in the art will appreciate that the hardware in FIG. 4 is a basic mobile device and may vary. The architecture of the aforementioned basic mobile device is not limiting and is only depicted as an example on which an embodiment of the present invention may be implemented.

Figure 5:
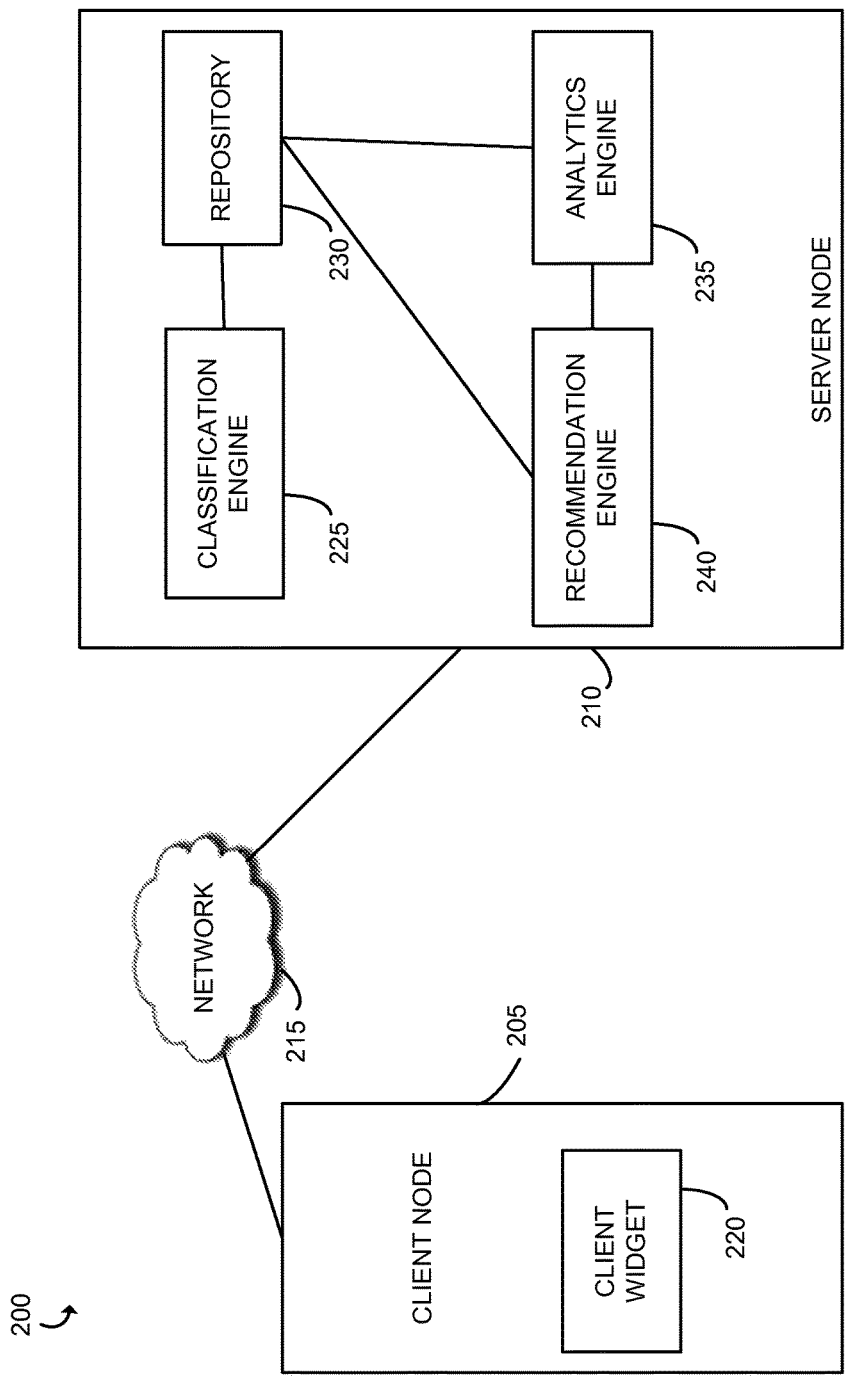
FIG. 5 depicts an exemplary system for generating recommendations based on an emotional state of an individual according to an embodiment of the present invention.

FIG. 5 depicts a system 200 for generating recommendations based on a mood of an individual in accordance with aspects of the present invention. The term mood used herein may be defined as a state of mind of an individual at a time instance. For example, the state of mind may be an emotional state of an individual over a time instance. As shown in the example of FIG. 5, the system 200 comprises a client node 205 and a server node 210 operatively connected to a network 215. In general, the client node 205 may include the computing device 54A, 54B, 54C, or 54N of FIG. 2 operated by a user. The server node 210 may include the computer system 12 of FIG. 1. The network 215, may be a communication network, such as a wireless network, local area network, wired network, or the internet.

According to one embodiment of the present invention, a client widget 220 is resident on the client node 205. In general the client widget 220 may be implemented as a program 40 of FIG. 1 on the computing devices 54A-N of FIG. 2. The client widget 220 is configured to capture one or more activities associated with an individual and transmit the captured activities to the server node 210 via the network 215. The activities may include, but not limited to, speech, text, image of facial expression, location information, social network interactions, scheduled events, and the like. For example, the speech detected by a microphone (e.g., the microphone 95 in FIG. 4) may be captured by the client widget 220. A camera (e.g., the camera 185 in FIG. 4) may be configured to capture an image of the user's facial expression at regular intervals and provide the captured facial expression image to the client widget 220. The location information of the user can be obtained from a global positioning (GPS) system. For example, in general a GPS system is present in cellular telephones (e.g., the cellular telephone 54A in FIG. 4). The client widget 220 may capture the scheduled events associated with the individual by accessing a calendar or planner of the user.

The server node 210 includes a classification engine 225, a repository 230, an analytics engine 235 and a recommendation engine 240. The classification engine 225 is configured to receive the captured activities transmitted by the client node 205 and classify the information corresponding to the activities. The classified information is provided by the classification engine 225 to the repository 230 and the repository 230 is configured to store the classified information. According to one embodiment of the present invention, the analytics engine 235 may be configured to access the repository for obtaining the classified information corresponding one or more activities required for determining the mood of the individual. For example, the analytics engine 235 may access the classified information corresponding to speech, text, social network interactions and facial expression image and process the classified information for detecting the mood of the individual.

According to one embodiment of the present invention, the classified information corresponding to speech may be processed to identify a language of the speech, a volume, a modulation, a pitch, and characteristics of conversation corresponding to the speech. For example, the characteristics of conversation, may include topic of discussion, the context and the like. The processing of the classified information corresponding to speech may also include performing a linguistic analysis to determine the mood of the individual. For example, the linguistic analysis may be performed by converting the speech to text.

According to one embodiment of the present invention, the analytics engine 235 may be configured to obtain the facial expression image of the user and determine a facial expression from the image. This may be performed by comparing the facial expression image with standard data corresponding to facial expressions. For example, the facial expression image of the user may be compared with standard template images corresponding to various facial expressions and detecting the facial expression of the user corresponding to the standard template with which the facial expression image of the user matches.

Similar to the processing performed for speech, the analytics engine 235 may be configured to determine characteristics of conversation corresponding to the social network interactions and text. Social network interactions may include interactions and conversation on social networking websites or blogs by the user. Text may include email communications, messages corresponding to instant messaging services, messages corresponding to short messaging services and the like. The analytics engine 235 may also be configured to perform linguistic analysis on the classified information corresponding to the social network interactions. The analytics engine 235 may be configured to determine the mood of the user using one or more parameters determined from speech, text such as email, instant messaging or social network interactions, and facial expression of the user.

The recommendation engine 240 is configured to generate a recommendation for the individual, responsive to the mood of the individual and a future event associated with the individual. The future event is an event having an occurrence at a later time instance. The future events associated with the individual may include scheduled events and unscheduled events. The recommendation engine 240 may obtain the information corresponding to scheduled events associated with the individual from the repository 230. According to one embodiment of the present invention, the recommendation engine 240 is configured to access the classified information corresponding to one or more activities stored at the repository 230 for determining the unscheduled events associated with the individual. For example, the recommendation engine 240 may identify the unscheduled events by analyzing the classified information corresponding to speech, text, social network interactions and the like. Therefore, the recommendation engine 240 is configured to generate recommendations for the individual based on the mood of the individual and the future events, including scheduled events and unscheduled events. This provides generating a real time recommendation for the individual as the unscheduled events are also taken into account.

According to one embodiment of the present invention, the recommendation engine 240 is configured to generate recommendations using environmental data and geographical data associated with the individual. To achieve this, for example, the recommendation engine 240 may obtain the location information of the individual from the classified information corresponding to location information of the individual stored at the repository 230. Using the location information of the individual, the recommendation engine 240 may obtain environmental data corresponding to the location information of the user and the geographical information. For example, the environmental data may include information, such as, weather information, temperature, air index, humidity, crowd level, noise index and the like. The geographical data may include a map of a region corresponding to the location of the individual. For example, the geographical data may include a map of the city the user is located in or a region. According to one embodiment of the present invention, the recommendation engine 240 may obtain the context and topic of conversation from the analytics engine 235 and obtain the map responsive to the context or topic being discussed. For example, topic of discussion may refer to the individual desiring to meet someone located at a different region in the same city. The recommendation engine 240 may obtain the map based on the topic of discussion and make a recommendation to the individual regarding the time of meeting and place of meeting. The recommendation engine may obtain the environmental data and the geographical data by accessing corresponding websites via the internet.

The environmental data may be used to generate recommendations which are appropriate for the individual at that point of time. For example, if the mood of the individual is identified as angry and the user is at a noisy and crowded location, the recommendation engine 240 may recommend the user go for a walk at a nearby park, wherein the noise level and crowd index is low.

According to one embodiment of the present invention, additionally, a personal profile of the user may be used to generate recommendations for the individual. Using information retrieved from the personal profile of the individual, enables generating appropriate recommendations as the individual's likes and dislikes may be taken into account. For example, the personal profile of the user may be obtained during the process of installation of the client widget 220 on to the client node 205 and stored at the repository 230 and the recommendation engine 240 may obtain the personal profile of the user by accessing the repository 230. For example, the personal profile of the user may be obtained during the installation process of the client widget 220 onto the client node 205 using a questionnaire which the user may answer.

According to one embodiment of the present invention, the recommendation engine 240 may be configured to update the personal profile of the user. For example, the analytics engine 235 may be configured to be in a learning mode to detect any changes in the profile information of the user and update the profile information stored in the repository 230. The analytics engine 235 may be configured to detect changes in profile information of the user using the classified information corresponding to one or more of the activities.

The recommendation engine 240 may be configured to transmit the recommendation generated to the client node 205. The client node 205 on receiving the recommendation may provide a visual indication of the recommendation to the individual by displaying the recommendation on the display.

Figure 6:
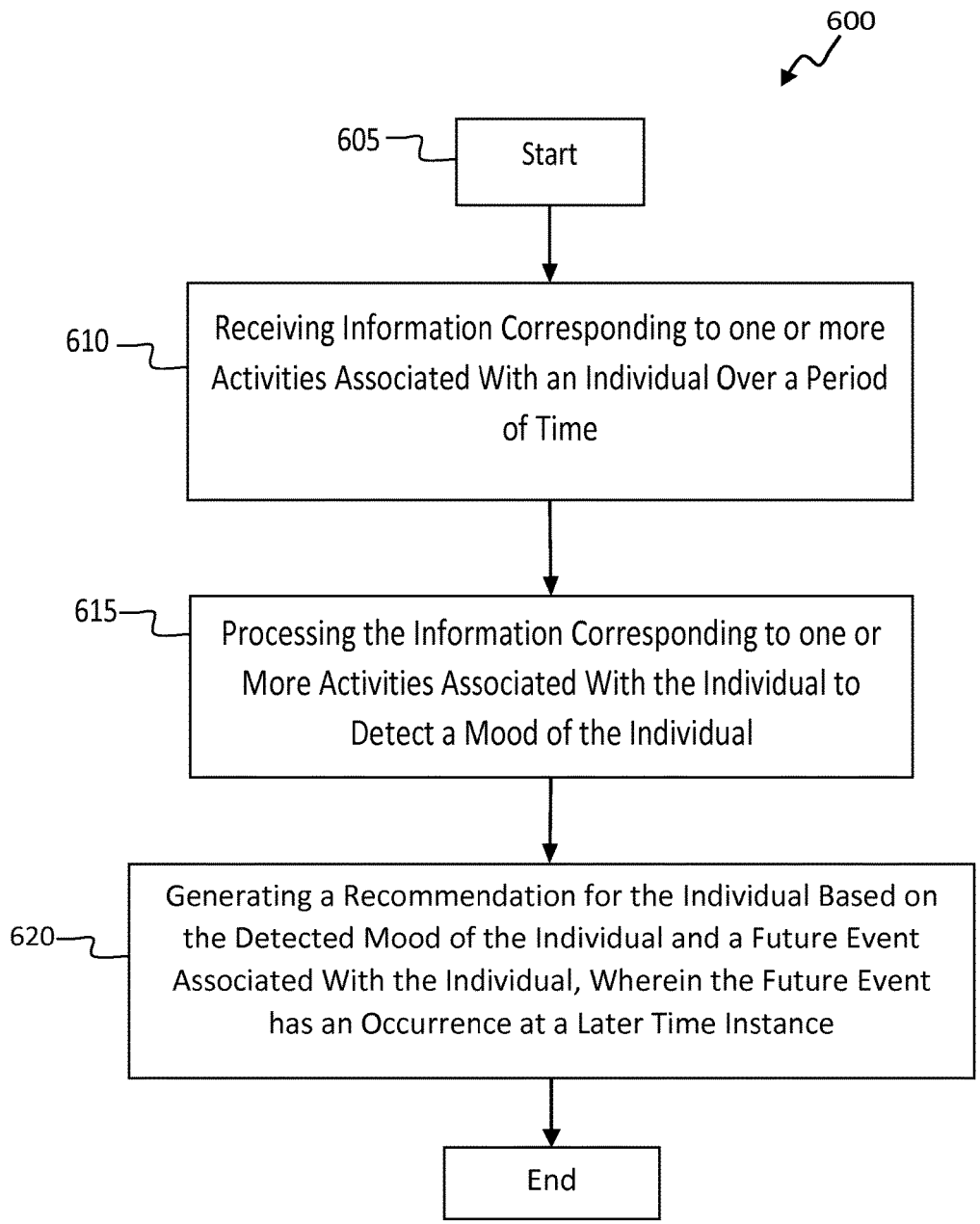
FIG. 6 shows an exemplary flow for performing aspects of the present invention.

FIG. 6 depicts an exemplary flow for a process 600 in accordance with aspects of the present invention. In embodiments, the process 600 can be performed by the server node 210 in FIG. 5.

At step 605, the process starts. At step 610, the server node (e.g., the server node 210 in FIG. 5) receives information corresponding to one or more activities associated with an individual over a period of time. The information corresponding to the activities is captured by a client widget (e.g., the client widget 220 in FIG. 5) resident in a client node (e.g., the client node 205 in FIG. 5) and transmitted via a network (the network 215 in FIG. 5). The server node is configured to receive the information corresponding to the activities. At step 615, the information corresponding to one or more activities associated with the individual is processed to detect a mood of the individual. A classification engine (e.g., the classification engine 225 in FIG. 5) may classify the information corresponding to the activities and an analytics engine (e.g., the analytical engine 235 in FIG. 5) detects the mood of the individual using the classified information. At step 620, a recommendation for the individual based on the detected mood of the individual and a future event associated with the individual is generated, wherein the future event has an occurrence at a later time instance.

The embodiments described herein enable generating recommendations for an individual based on a mood of the individual and a future event associated with the individual. The recommendation is made based on the current mood of the individual such that recommendations may be provided to the user talking into account the future events associated with the individual. The future events may be scheduled events, for example entries in calendar or planner or unscheduled events deduced from the activities of the individual.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
one or more computer processors, one or more non-transitory computer readable storage media, and program instructions stored on one or more of the computer-readable storage media for execution by at least one of the one or more processors, the program instructions, when executed by the at least one of the one or more processors, causing the computer system to perform a method comprising:
receiving, by the computer system over a network, speech information detected by a microphone of a user computing device, text information collected by a touch input device of the user computing device, facial expression information periodically detected by a camera of the user computing device, social networking interaction information from social networking websites corresponding to one or more activities associated with an individual over a period of time, and geographical and environmental information including weather information associated with the individual, wherein the received information is captured and transmitted by a widget of the user computing device;
classifying, by the computer system, the received information according to the one or more activities associated with the individual;
detecting, by the computer system, a location of the individual, environmental and weather conditions associated with the location of the individual, a context and topic of conversation between the individual and a person, and a mood of the individual based on performing linguistic analyses on the classified speech information, performing linguistic analyses on the classified text information, performing linguistic analyses on the classified social networking interaction information, and performing analyses on the received facial expression information by comparing the received facial expression information to template images of facial expressions;
determining, by the computer system, a future event associated with the individual based on the classified information corresponding to speech, text, and social network interactions, wherein the future event comprises an unscheduled future event;
generating, by the computer system, a notification that includes a recommendation for the individual based on the detected location, environmental and weather conditions of the detected location, the detected mood of the individual, the detected context and topic of conversation, and the future event associated with the individual, wherein the recommendation comprises a time and location for meeting the person with which the individual had the conversation; and
transmitting, by the computer system over the network, the notification to the user computing device to cause the widget of the user computing device to activate and display a visual indication of the recommendation to the individual by a display of the user computing device.

2. The computer system of claim 1, wherein the geographical information includes a location information of the individual.

3. The computer system of claim 1, wherein the method further comprises:
retrieving, by the computer, a personal profile information of the individual; and
generating, by the computer, the recommendation for the individual based on the detected mood of the individual, the future event associated with the individual, and the personal profile information of the individual.

4. The computer system of claim 1, wherein processing the information received corresponding to the one or more activities associated with the individual to detect the mood of the individual further comprises:
classifying, by the computer, the information corresponding to the one or more activities; and
detecting, by the computer, the mood of the individual using the classified information.

5. The computer system of claim 1, wherein the one or more activities comprises one or more of a voice call, email, instant messages, short messaging service (SMS), social network interactions, and facial expressions.

6. The computer system of claim 1, wherein the future event associated with the individual is obtained from a calendar associated with the individual.

7. The computer system of claim 1, wherein the future event is obtained by analyzing one or more activities associated with the individual.

8. A computer program product comprising:
a non-transitory computer readable storage medium having program code embodied therewith, the program code executable by one or more processors of a computer system for causing the computer system to perform a method comprising:
receiving, by the computer system over a network, speech information detected by a microphone of a user computing device, text information collected by a touch input device of the user computing device, facial expression information periodically detected by a camera of the user computing device, social networking interaction information from social networking websites corresponding to one or more activities associated with an individual over a period of time, and geographical and environmental information including weather information associated with the individual, wherein the received information is captured and transmitted by a widget of the user computing device;
classifying, by the computer system, the received information according to the one or more activities associated with the individual;
detecting, by the computer system, a location of the individual, environmental and weather conditions associated with the location of the individual, a context and topic of conversation between the individual and a person, and a mood of the individual based on performing linguistic analyses on the classified speech information, performing linguistic analyses on the classified text information, performing linguistic analyses on the classified social networking interaction information, and performing analyses on the received facial expression information by comparing the received facial expression information to template images of facial expressions;

determining, by the computer system, a future event associated with the individual based on the classified information corresponding to speech, text, and social network interactions, wherein the future event comprises an unscheduled future event;

generating, by the computer system, a notification that includes a recommendation for the individual based on the detected location, environmental and weather conditions of the detected location, the detected mood of the individual, the detected context and topic of conversation, and the future event associated with the individual, wherein the recommendation comprises a time and location for meeting the person with which the individual had the conversation; and transmitting, by the computer system over the network, the notification to the user computing device to cause the widget of the user computing device to activate and display a visual indication of the recommendation to the individual by a display of the user computing device.

9. The computer program product of claim 8, wherein the geographical information includes a location information of the individual.

10. The computer program product of claim 8, wherein the method further comprises:

retrieving, by the computer system, a personal profile information of the individual; and generating, by the computer system, the recommendation for the individual based on the detected mood of the individual, the future event associated with the individual, and the personal profile information of the individual.

* * * * *